Feb. 8, 1927. 1,616,886
L. W. CHASE ET AL
JOCKEY ARCH DISK ADJUSTMENT
Filed Oct. 14, 1924
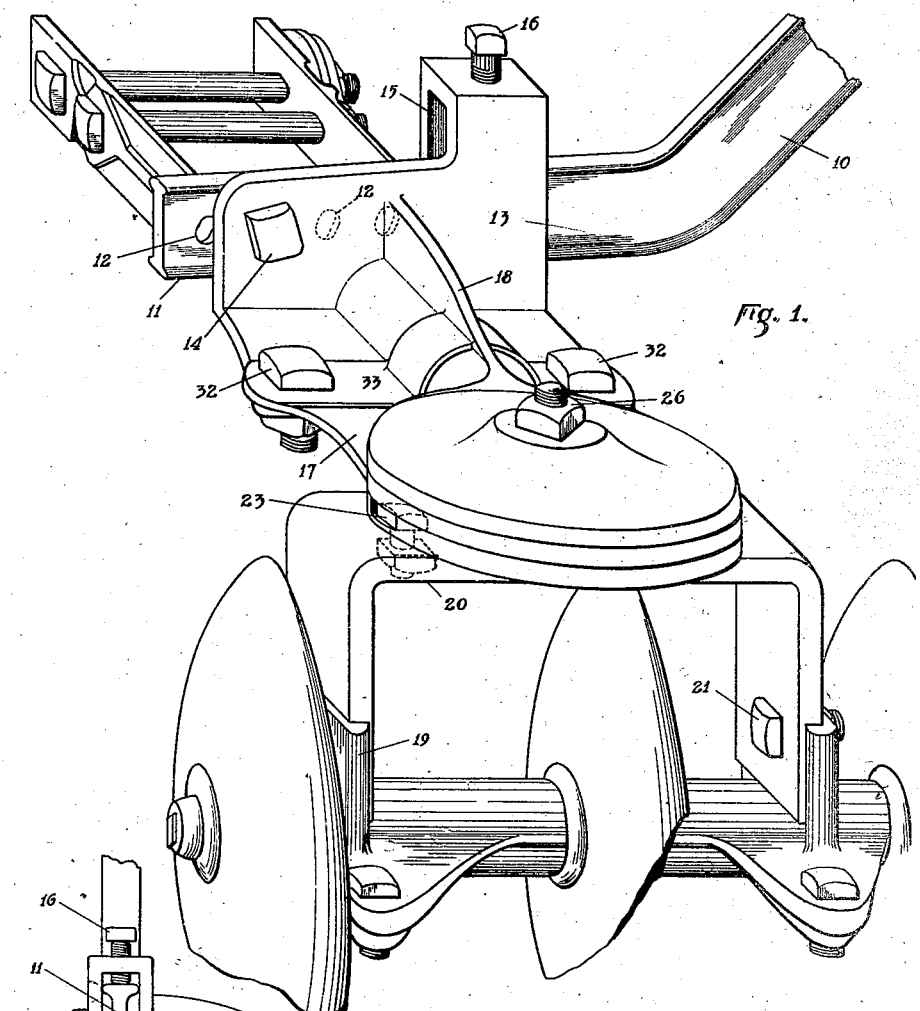
L. W. CHASE.
J. C. BRAND.
INVENTORS.
BY
ATTORNEY.

Patented Feb. 8, 1927.

1,616,886

UNITED STATES PATENT OFFICE.

LEON W. CHASE AND JAMES C. BRAND, OF LINCOLN, NEBRASKA, ASSIGNORS TO CHASE PLOW COMPANY, OF LINCOLN, NEBRASKA, A CORPORATION OF NEBRASKA.

JOCKEY-ARCH DISK ADJUSTMENT.

Application filed October 14, 1924. Serial No. 743,552.

Our invention relates to disk gang adjusting devices for use on the arch member of a jockey arch cultivator. Cultivators of this type are provided with an arch member which is adapted to straddle the row of standing corn or other similar crop, and which further serves as a support for the disk gangs. The primary object of our invention is to provide a connection between the disk gang and the jockey arch, the connection being such that the disk gangs may be adjusted laterally with reference to the corn row or adjusted axially about either a horizontal axis or a vertical axis or both. Other objects will be pointed out in the following description.

Referring now to the drawings:

Figure 1 is a perspective view showing a portion of the jockey arch with the disk gang and our adjusting device attached thereto.

Figure 2 is a side elevation of the adjusting device, parts being shown in section.

Figure 3 is a plan view of the yoke.

Numeral 10 indicates a portion of the jockey arch which in this instance is formed from an I-beam. The arch has the form of an inverted V and has laterally projecting arms 11 for supporting the disk gang. Each of the arms 11 is provided with a series of apertures for receiving a bolt 14 which is slightly smaller in diameter than the aperture. The arch 10 is secured to the implement frame through the connections described below. In effect, it is a part of the implement frame, but it is connected thereto only through the connections for securing the disk gang supports to the frame and to the arch.

The connection for supporting the disk gang on the arch and on the implement frame includes an irregularly shaped casting 13 having an aperture in its lateral wall. The bolt 14 passing through this aperture and through one of the apertures 12 secures the casting to the arch and provides a means for adjusting the disk gang laterally and of properly spacing the disk gangs on the cultivator. The casting 13 is also provided with a vertical guide way 15 for receiving the arm 11 of the arch and this guide way has horizontal walls at both the top and bottom, both of which have screw threaded apertures for receiving the set screws 16 whereby the casting 13 may be axially adjusted. The casting 13 also includes a substantially horizontal portion terminating in a tongue 17, which is reinforced by a web 18.

The disk gang has bearings with standards 19 which are adapted to be clamped and bolted to the depending arms of the yoke 20 by means of the bolts 21. For securing the yoke 20 to the tongue 17 we employ the structure shown in Figure 2. The washer 22 is first bolted to the yoke 20, apertures 23 being provided in the washer for receiving the bolt heads. The washer 22 also has depending parallel flanges 24 for engaging the edges of the top wall of the yoke 20 to prevent the possibility of the turning of the washer 22. Another washer 25 is positioned above the tongue 17 and the bolt 26 secures the yoke and both washers to the tongue 17 in frictional contact only. The washers 22 and 25 are each provided with shoulders on their inner sides which enter the aperture in the tongue 17 to prevent displacement of the washers. An additional washer 27 is placed immediately above the washer 25. It should be noted that the opposite surfaces of the tongue and the inner surfaces of the washers 22 and 25 are smooth, since the absence of teeth, corrugations or the like friction elements makes it possible to adjust the disk gang through very small arcs. By this means we obtain an axial adjustment of the disk gang about the bolt 26. The adjustment is such that we may turn the gang so as to throw the dirt either in or out, but at the same time it is possible by this means to make an adjustment of a mere fraction of an inch.

The yoke 28 shown in Figure 3 is also secured to a fixed portion of the implement, and it is adjustable laterally with respect to the implement frame. It has a rearwardly extending spindle 29 which is provided with a collar 30 integral therewith. The casting 13 has a semi-cylindrical bearing for the spindle 29, the bearing being enlarged for receiving the collar 30. A second casting 31 secures the spindle 29 in rocking relation with the casting 13, the casting 13 being secured to the casting 31 by means of bolts 32. The casting 13 is thickened on its outer side at 33 to strengthen the portion through which the bolts 32 pass and also to provide for the enlargement of the bearing receiving the collar 30.

The draft of the disk gang is applied largely through the spindle 29, the collar 30 serving as a rigid anchor to prevent displacement of the parts. The primary function of the spindle 29 is to serve as an axis for the axial adjustment of the disk gang on the arch. The casting 13, and with it the disk gang, is secured to the implement frame at two points, at 14 and 30. When the set screws 16 are adjusted the casting 13 is rocked about the spindle 29, but the movement of the casting at the bolt connection 14 is very slight so that under ordinary conditions the slight play between the bolt 14 and aperture 12 is sufficient to permit such movement. In certain cases however, it may be found to be desirable to increase the range of the arcuate movement. This may of course be accomplished in various ways, one of which we have shown in our drawings. As shown in Figure 1, the apertures 12 are lengthened slightly in the direction of the arcuate movemeent about the spindle 29.

The arch 10 is secured rigidly to the implement frame and is adapted to straddle the rows of standing corn or other crop while the implement is being propelled through the field. Its primary function however is to support the cultivator disk gangs in fixed but adjustable position to work the earth on both sides of the corn row.

Our device provides three separate and distinct adjustments for the disk gang relative to the implement frame. The casting 13 may be shifted laterally to any desired position and then locked in that position by means of the yoke 28 and its connections, and by means of the bolt 14 passing through the proper aperture 12. The position of the disks relative to the corn row may thus be varied so that the soil will be worked either close to or remote from the corn row. Such adjustments are particularly important for the successive cultivations of the season, the first cultivation being preferably deep and close to the row while the later cultivations are shallower and increasingly more remote from the row. The adjustment about the spindle 29 may be made to cut at a uniform depth or it may be adjusted so that either the inner or the outer disk cuts deeply while the opposite disk of the gang works at or near the surface of the soil. This adjustment will be found to be particularly useful at certain stages of the growth of the corn when it is best to cut a deep gash in the middle of the space between two rows and to merely scrape the surface of the soil adjacent to the rows, or vice versa. By means of the axial adjustment of the disk gang about the bolt 26, both the width of the cultivated strip and the angle of cut may be varied at will.

While we have described and illustrated our invention in a very specific manner, we do not desire to be restricted to the use of the specific forms which we have shown and described, but we reserve to ourselves all of our rights to any or all equivalents of the structures which we claim in specific terms.

Having thus described our invention in terms which will be readily understood by others skilled in the art to which it pertains, what we claim as new and desire to secure by Letters Patent of the United States is:—

1. Means for adjustably securing a cultivator disk to a cultivator frame having a jockey arch which is secured to the cultivator frame, said means including a pivot pin secured to and projecting rearwardly from the cultivator frame, a disk supporting bracket secured on said pivot pin, said bracket being provided with an elongated opening for receiving an end portion of the jockey arch and permitting limited rocking movement of the bracket about said pivot pin, and means associated with said bracket for axially adjusting said bracket on the pivot pin.

2. In a cultivator having a jockey arch secured to the cultivator frame, the jockey arch being provided with an outwardly and laterally projecting arm, a disk supporting bracket pivotally secured to the cultivator frame on a forwardly and rearwardly extending axis, said disk supporting bracket being provided with an elongated opening for receiving the laterally projecting arm of the jockey arch and for permitting limited rocking movement of the bracket about its axis, and means on said bracket for adjusting said bracket about its axis.

3. A device for axially adjusting a cultivator disk about a vertical axis including an implement frame, a support for the disk, a washer secured to said support, a second washer above said first named washer, both of said washers having inwardly projecting annular flanges, a tongue secured to the implement frame and having its rear portion positioned between said two washers, said tongue being provided with an aperture for receiving the annular shoulders of said washers, and means for locking said disk support in adjusted position relative to said tongue.

4. In a cultivator having a jockey arch, a disk supporting bracket secured on a forwardly and rearwardly extending axis to the cultivator, said bracket being provided with an opening for receiving the free end portion of the jockey arch in a manner to permit limited rocking movement of the said bracket about its axis, said bracket being secured to the arch at a point eccentric to the axis, and means associated with said bracket and the jockey arch for adjusting said bracket about its axis.

5. In a cultivator having a jockey arch, a disk supporting bracket secured on a forwardly and rearwardly extending axis to the cultivator, said bracket being provided with an opening for receiving the free end portion of the jockey arch in a manner to permit limited rocking movement of the said bracket about its axis, means associated with said bracket and the jockey arch for adjusting said bracket about its axis, and means for securing said bracket to the jockey arch at any one of a plurality of points eccentric to the axis of said bracket.

6. In combination, an implement frame having a pivot, a bracket mounted to turn about said pivot, a disk support carried by said bracket and mounted to pivot about the bracket at substantially right angles to the pivotal movement of the bracket about the implement frame, a jockey arch having an arm engaging loosely through said bracket and being pivoted to the bracket eccentric to the pivotal axis between the implement frame and the bracket, said arm having a loose and adjustable pivotal connection with the bracket, and means on the bracket acting on said arm remote from said last mentioned pivot point for swinging the bracket about said last mentioned pivot.

In testimony whereof we affix our signatures.

JAMES C. BRAND.
LEON W. CHASE.